United States Patent
Levesque et al.

(10) Patent No.: US 10,078,384 B2
(45) Date of Patent: Sep. 18, 2018

(54) METHOD AND APPARATUS FOR PROVIDING HAPTIC CUES FOR GUIDANCE AND ALIGNMENT WITH ELECTROSTATIC FRICTION

(71) Applicant: IMMERSION CORPORATION, San Jose, CA (US)

(72) Inventors: Vincent Levesque, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 222 days.

(21) Appl. No.: 13/782,771

(22) Filed: Mar. 1, 2013

(65) Prior Publication Data
US 2014/0139448 A1    May 22, 2014

Related U.S. Application Data

(60) Provisional application No. 61/728,718, filed on Nov. 20, 2012.

(51) Int. Cl.
| | |
|---|---|
| *G06F 3/041* | (2006.01) |
| *G06F 3/01* | (2006.01) |
| *G06F 3/0488* | (2013.01) |

(52) U.S. Cl.
CPC .............. *G06F 3/041* (2013.01); *G06F 3/016* (2013.01); *G06F 3/0416* (2013.01); *G06F 3/0488* (2013.01); *G06F 2203/04809* (2013.01)

(58) Field of Classification Search
None
See application file for complete search history.

(56) References Cited

U.S. PATENT DOCUMENTS

| | | | |
|---|---|---|---|
| 6,429,861 B1 | 8/2002 | Hossack et al. | |
| 7,706,616 B2 * | 4/2010 | Kristensson | G06K 9/222 |
| | | | 382/187 |

(Continued)

FOREIGN PATENT DOCUMENTS

| | | |
|---|---|---|
| CN | 101533330 | 9/2009 |
| CN | 102349039 | 2/2012 |

(Continued)

OTHER PUBLICATIONS

Extended Search Report, including the Search Opinion, as issued for European Patent Application No. 13193441.6, dated Jun. 23, 2014.

(Continued)

*Primary Examiner* — Benjamin C Lee
*Assistant Examiner* — Krishna Neupane
(74) *Attorney, Agent, or Firm* — Kilpatrick Townsend & Stockton LLP

(57) ABSTRACT

A haptic effect enabled device for producing a haptic effect. In some cases, the haptic effect may represent a component of a spatial pattern represented on a surface of the haptic effect enabled device. In some cases, the haptic effect enabled device may comprise a haptic output device, a drive module, and a drive circuit. The drive module may receive information indicative of a location of a touch input at the surface and determine whether the touch input's location corresponds with a location of one of multiple components of the spatial pattern. The drive module may generate a drive signal that the drive circuit then applies to the haptic output device to generate the haptic effect.

20 Claims, 16 Drawing Sheets

(56) References Cited

U.S. PATENT DOCUMENTS

| | | | |
|---|---|---|---|
| 8,542,206 B2* | 9/2013 | Westerman et al. | 345/173 |
| 8,667,414 B2* | 3/2014 | Zhai et al. | 715/773 |
| 2004/0145600 A1 | 7/2004 | Cruz-Hernandez et al. | |
| 2005/0190973 A1 | 9/2005 | Kristensson et al. | |
| 2006/0028450 A1* | 2/2006 | Suraqui | 345/169 |
| 2007/0061753 A1* | 3/2007 | Ng et al. | 715/816 |
| 2009/0159482 A1 | 6/2009 | Okada | |
| 2009/0227295 A1* | 9/2009 | Kim | G06F 3/016 455/566 |
| 2009/0262041 A1 | 10/2009 | Ikemoto et al. | |
| 2010/0231367 A1* | 9/2010 | Cruz-Hernandez | G06F 3/016 340/407.2 |
| 2010/0267424 A1* | 10/2010 | Kim | G06F 3/016 455/566 |
| 2011/0115709 A1 | 5/2011 | Cruz-Hernandez | |
| 2011/0199342 A1 | 8/2011 | Vartanian et al. | |
| 2011/0201387 A1 | 8/2011 | Paek et al. | |
| 2011/0248916 A1* | 10/2011 | Griffin | G06F 3/016 345/157 |
| 2012/0036469 A1* | 2/2012 | Suraqui | 715/773 |
| 2012/0113008 A1 | 5/2012 | Makinen et al. | |
| 2012/0268412 A1 | 10/2012 | Cruz-Hernandez et al. | |
| 2013/0179816 A1* | 7/2013 | Seo | G06F 3/04842 715/770 |
| 2014/0118127 A1 | 5/2014 | Levesque et al. | |

FOREIGN PATENT DOCUMENTS

| | | |
|---|---|---|
| CN | 102713793 | 10/2012 |
| JP | 2009-181261 A | 8/2009 |
| JP | 2009-217816 A | 9/2009 |
| JP | 2010-152888 A | 7/2010 |
| JP | 2011-501298 A | 1/2011 |
| JP | 2011-54196 A | 3/2011 |
| JP | 2011-528826 A | 11/2011 |
| JP | 2012-221387 A | 11/2012 |
| WO | 9806024 | 2/1998 |
| WO | WO 98/06024 | 2/1998 |
| WO | WO 2010/105001 | 9/2010 |
| WO | 2011/062895 A2 | 5/2011 |
| WO | 2012/108342 A1 | 8/2012 |
| WO | 2012145264 | 10/2012 |
| WO | 2014/006799 A1 | 1/2014 |

OTHER PUBLICATIONS

Communication Pursuant to Article 94(3) EPC, as issued for European Patent Application No. 13193441.6, dated Jun. 22, 2015.
Bau, O., et al., "TeslaTouch: Electrovibration for Touch Surfaces," Proceedings of the 23$^{rd}$ Annual ACM Symposium on User Interface Software and Technology, UIST '10, Oct. 2010, pp. 283-292.
European Patent Office Application No. 13193441.6, Decision to Refuse a European Patent Application dated Mar. 3, 2017.
Japanese Patent Office Application No. 2013-216343, Office Action with translation dated Jul. 25, 2017, 13 pages.
CN201310581277.3 , "Office Action", Aug. 16, 2017, 19 pages.
State Intellectual Property Office of the Peoples Republic of China Application No. 201310581277.3, Office Action with translation dated Aug. 16, 2017, 19 pages.
JP 2013-216343, "Office Action", Apr. 3, 2018, 13 pages.
CN 201310581277.3, "Office Action", Apr. 23, 2018, 13 pages.

* cited by examiner

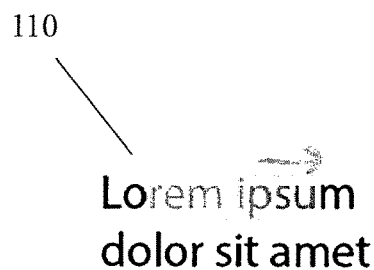
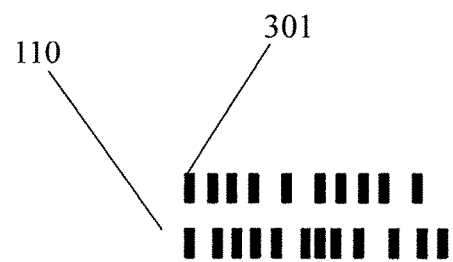
FIG. 13A                FIG. 13B
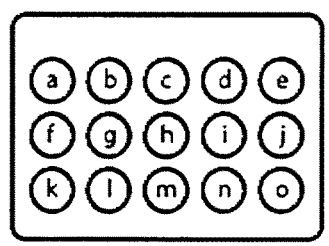
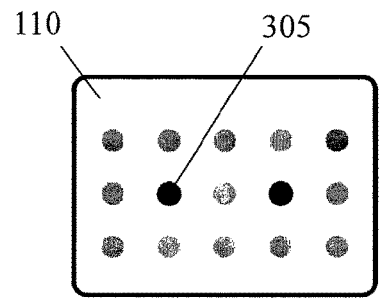
FIG. 14A                FIG. 14B
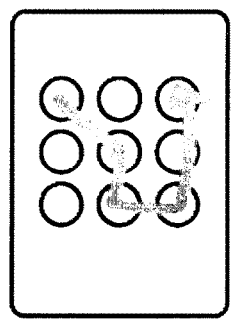
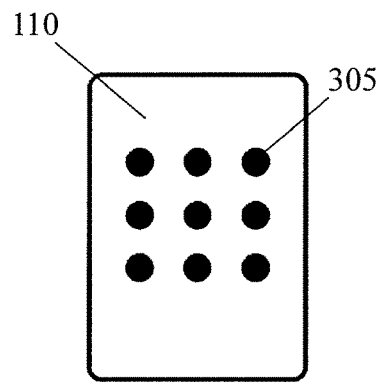
FIG. 15A                FIG. 15B

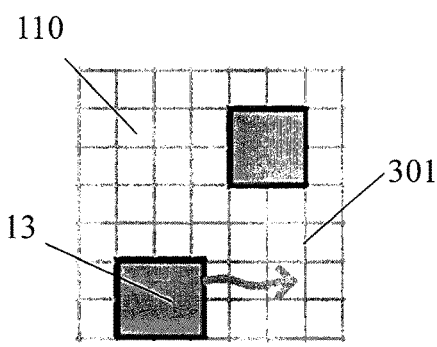
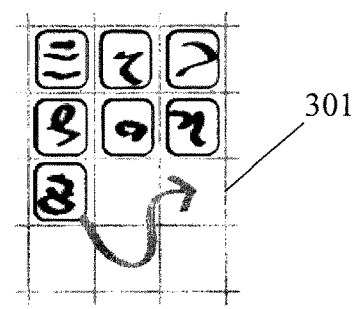
FIG. 16A  FIG. 16B
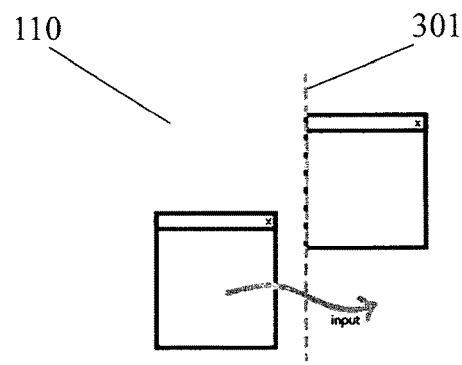
FIG. 17

METHOD AND APPARATUS FOR PROVIDING HAPTIC CUES FOR GUIDANCE AND ALIGNMENT WITH ELECTROSTATIC FRICTION

CROSS-REFERENCE TO RELATED APPLICATIONS

This application claims the benefit of priority from U.S. Provisional Patent Application No. 61/728,718, filed Nov. 20, 2012 and incorporated herein by reference in its entirety.

FIELD OF THE INVENTION

The invention relates to a method and apparatus for simulating surface features on a user interface with haptic effects.

BACKGROUND OF THE INVENTION

Some electronic user interface devices provide a display screen through which displayed objects may be moved, rotated, or otherwise manipulated. While a user may move a displayed object to a general area on the screen, moving the object to a precise location on the screen may be difficult. A user moving the object may have difficulty moving the object to precise locations on the display screen because such locations are not identified on the screen, or may be obscured by the user's hand. Overall, the ability to convey spatial details on a user interface screen is limited.

SUMMARY

According to an aspect of the present invention, there is provided a method for producing a haptic effect. The method may include receiving information indicative of a location of a touch input at a surface. A determination may be made on whether the location of the touch input corresponds with a location of one of multiple spatial pattern components that are represented at multiple locations on the surface. A drive signal may be generated. The drive signal may be applied to a haptic output device in response to the determination that the location of the touch input corresponds with the location of the one of the multiple spatial pattern components. The haptic output device may be driven to produce a haptic effect at the surface.

According to an aspect of the invention, there is provided a method of producing a haptic effect. The method may include detecting a touch input on a surface and receiving information indicative of a location of a virtual object being moved by the touch input on the surface. The method may further include determining whether the location of the virtual object corresponds with a location of one of multiple spatial pattern components represented at multiple locations on the surface. A drive signal may be generated, and may be applied to a haptic output device in response to a determination that the location of the virtual object corresponds with the location of the one of the multiple spatial pattern components.

In an embodiment, the spatial pattern components may be selected from the group consisting of lines, points, tiles, and concentric circles.

According to an aspect of the present invention, there is provided a haptic effect enabled device that comprises a haptic output device, a drive module, and a drive circuit. The drive module may be configured to receive information indicative of a location of a touch input at the surface. The drive module may determine whether the location corresponds with a location of one of multiple spatial pattern components represented on the surface. The drive module may generate a drive signal. A drive circuit may apply the drive signal to the haptic output device in response to the determination that the location of the touch input corresponds with the location of the one of the multiple spatial pattern components.

According to an aspect of the present invention, there is provided a haptic effect enabled device that is configured to produce a haptic effect at a surface. The haptic effect enabled device may comprise a drive module, a drive circuit, and a haptic output device. The drive module may be configured to receive information indicative of a location of a virtual object being moved by a touch input received at the surface. The drive module may further be configured to determine whether the location of the virtual object corresponds with a location of one of multiple spatial pattern components represented at multiple locations on the surface. The drive module may further be configured to generate a drive signal. The drive circuit may be configured to apply the drive signal to the haptic output device in response to the determination that the location of the virtual object corresponds with the location of the one of the multiple spatial pattern components.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIGS. 13A-13B schematically illustrate text represented through spatial pattern components on the surface of the apparatus of FIG. 1A;

FIGS. 14A-14B schematically illustrate a keyboard represented through spatial pattern components on the surface of the apparatus of FIG. 1A;

FIGS. 15A-15B schematically illustrate a gestural unlock movement across spatial pattern components on the surface of the apparatus of FIG. 1A;

FIGS. 16A-16B schematically illustrate one or more snap locations represented by one or more spatial pattern components on the surface of the apparatus of FIG. 1A;

FIG. 17 schematically illustrates a spatial pattern component with a dynamic location based on a location of an object displayed on the surface of the apparatus of FIG. 1A;

DETAILED DESCRIPTION

Figure 1A:
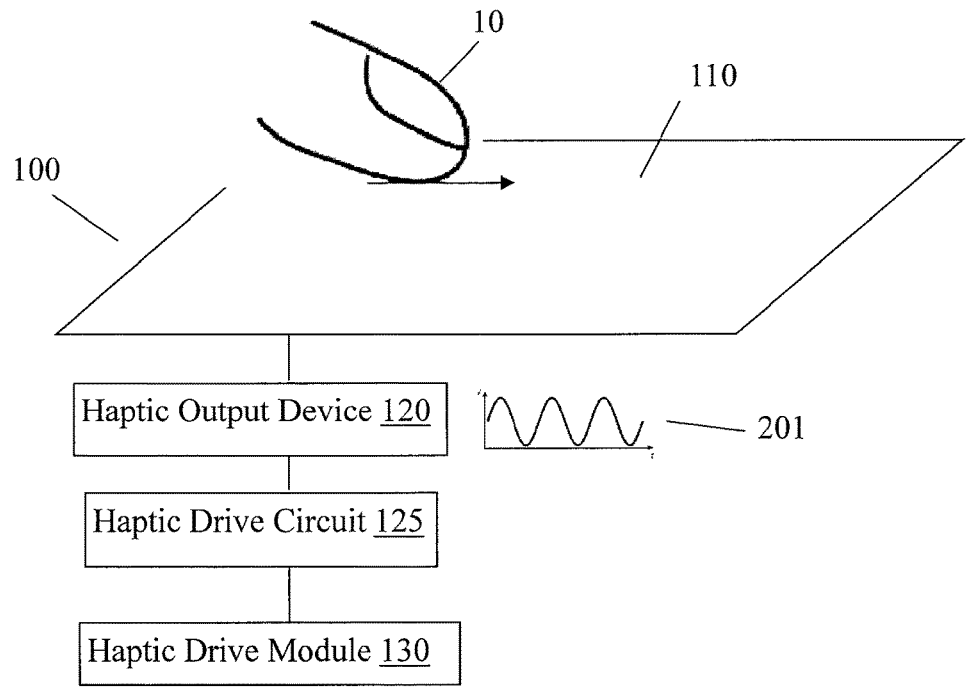
FIGS. 1A-1B schematically illustrate an apparatus in accordance with an embodiment of the invention.

FIG. 1A illustrates an embodiment of a haptic effect enabled user interface device 100 that may generate a haptic effect at a surface 110 of the device. The haptic effect may be generated to simulate a feature, such as a surface feature, represented by device 100. For example, the simulated surface feature may be a simulated texture, spatial pattern, edge or border, or any other tactile sensation, whether natural or artificial, of surface 110. The spatial pattern may include a grid of straight lines, a grid of concentric circles, a grid of points, a grid of tiles, any combination thereof, or any other spatial pattern. In an embodiment, surface 110 may be a touch screen that displays an image corresponding to the simulated surface feature, such as an image of spatial pattern components of the spatial pattern. In an embodiment, surface 110 may be a touch pad that corresponds to a display of the image, or any other touch interface.

Device 100 may include a mobile phone, tablet computer, television, electronic display, touch pad, or any other electronic user interface device.

In an embodiment, device 100 may comprise a haptic drive module 130, a haptic output device 120 to generate haptic effects, and a haptic drive circuit 125 operatively coupled to the haptic drive module 130 and the haptic output device 120 so as to apply a drive signal to the haptic output device. Haptic drive module 130 may include a controller, which may include one or more processors, or any other processing unit. Haptic drive circuit 125 may comprise an amplifier configured to amplify or buffer a signal from the haptic drive module 130. In an embodiment, haptic drive circuit 125 may be omitted, and haptic drive module 130 may output a signal directly to haptic output device 120. Haptic output device 120 may include an actuator (e.g., a voice coil, ultrasonic vibration device, solenoid, piezoelectric device, or any other actuator), an electrostatic device, or any other haptic output device. The ultrasonic vibration device may, in some instances, reduce a level of friction at surface 110. Haptic drive module 130 may be operatively coupled to haptic output device 120, which may be operatively coupled to surface 110. Haptic output devices are discussed in more detail in U.S. patent application Ser. No. 13/092,269, titled "Electro-vibrotactile Display," filed Apr. 22, 2011, and published on Oct. 25, 2012 as United States Patent Application Publication No. 2012/0268412, the entire content of which is incorporated herein by reference.

In an embodiment, haptic drive module 130 and haptic output device 120 may simulate surface features at surface 110 by controlling a level of friction. For example, a haptic output device 120 that includes an actuator may control friction through generating vibrations at surface 110. A haptic output device 120 that includes an electrostatic device may control a level of friction through applying a voltage to or underneath surface 110. An alternating voltage signal, for example, may create a capacitive effect that attracts finger 10, a stylus, or any other object at surface 110. The attractive force at the surface may be perceived as friction as the object moves across the surface. Increasing the attractive force may increase a level of friction at the surface. Controlling friction through a haptic effect is discussed in more detail in U.S. patent application Ser. No. 13/092,269, titled "Electro-vibrotactile Display," filed Apr. 22, 2011, and published on Oct. 25, 2012 as United States Patent Application Publication No. 2012/0268412, the entire content of which is incorporated herein by reference. As described in that application, an electrostatic device may, in an embodiment, be used with a surface 110 that includes a conductive layer having one or more electrodes and that includes an insulating layer. The conducting layer may be any semiconductor or other conductive material. The insulating layer may be glass, plastic (e.g., thermoplastic), polymer, or any other insulating layer. The electrostatic device may operate by applying an AC signal that, in an embodiment, capacitively couples the conducting layer with an object near or touching surface 110. The AC signal may be generated by a high-voltage amplifier.

The capacitive coupling may control a level of friction on the surface 110. In an embodiment, a surface feature may be simulated by controlling the level of friction on the surface 110. Varying the levels of attraction between the object and the conducting layer can vary the friction on an object moving across the surface 110. A region having a different level of friction than surrounding regions may represent a spatial pattern component, a texture, or any other surface feature.

The capacitive coupling may also generate a haptic effect by stimulating parts of the object near or touching the surface 110, such as mechanoreceptors in the skin of a user's finger. In an example, the conducting layer may be applied with an AC voltage signal that couples with conductive parts of a user's finger. As the user moves his or her finger on the screen, the user may sense a texture of prickliness, graininess, bumpiness, roughness, stickiness, or some other texture. In an embodiment, surface 110 does not have an insulating layer, so that an object can directly touch the conducting layer. A haptic effect can be generated by applying a voltage from the conducting layer to the object through an electrically conductive path. Simulating a texture through a periodic or other haptic effect is discussed in more detail in U.S. patent application Ser. No. 13/665,526, titled "Method and Apparatus for Simulating Surface Features on a User Interface with Haptic Effects," filed Oct. 31, 2012, the entire content of which is incorporated herein by reference.

In an embodiment, a haptic effect is not confined to a surface (e.g., surface 110) of an electronic user interface device. In an embodiment, a user's hand, for example, may touch objects beyond a touch screen or touchpad and still perceive a haptic effect. The haptic effect may be generated by, for example, applying a voltage directly to the user's body from a signal generator or any other voltage-generating device. In some instances, the voltage-generating device may be a standalone device adapted to be mounted at a location that frequently comes into contact with the user's body. The voltage may be applied whenever a sensor detects that the user's body is touching an object on which a spatial pattern or other surface feature is to be simulated. The voltage may place a charge on the user's body. Capacitive interaction between the charge on the user's body and the object being touched may create an attractive force between the user's body and the object. The force of attraction may control a level of friction at a surface of the object, which may simulate a spatial pattern on a surface of the object being touched.

In an embodiment, a user may perceive a simulated spatial pattern on an object both through an electrostatic effect that is generated at a surface of the object and through an augmented reality experience created by an electronic user interface device. For example, the electronic user interface device may create an augmented reality experience by displaying a captured image of an object and overlaying a grid or other spatial pattern on the image. In an embodiment, the user may perceive the spatial pattern on the object both by touching the object and by seeing the graphical representation of the spatial pattern overlaid on the object on the electronic user interface.

In an embodiment, haptic drive module 130 may be configured to cause haptic output device 120 to generate a periodic haptic effect. FIG. 1A, for example, illustrates a periodic haptic effect based on haptic drive signal 201. In some instances, a haptic drive signal may be a periodic drive signal. In some instances, haptic drive signals may represent haptic effects generated by haptic output devices. For example, if haptic output device 120 includes an electrostatic device, a haptic effect based on haptic drive signal 201 may include a sinusoidal AC voltage that has a frequency and amplitude matching or proportional to haptic drive signal 201. If haptic output device 120 includes an actuator, a haptic effect based on haptic drive signal 201 may include a vibration that that has a frequency and amplitude matching haptic drive signal 201. The periodic haptic effect may vary according to a sinusoidal waveform, as illustrated in FIG. 1A, a square, triangular, or sawtooth waveform, or any other periodic waveform. For example, a periodic electrostatic effect may be generated by an AC voltage having a sinusoidal, square, triangular, sawtooth, or any other waveform.

Figure 1B:
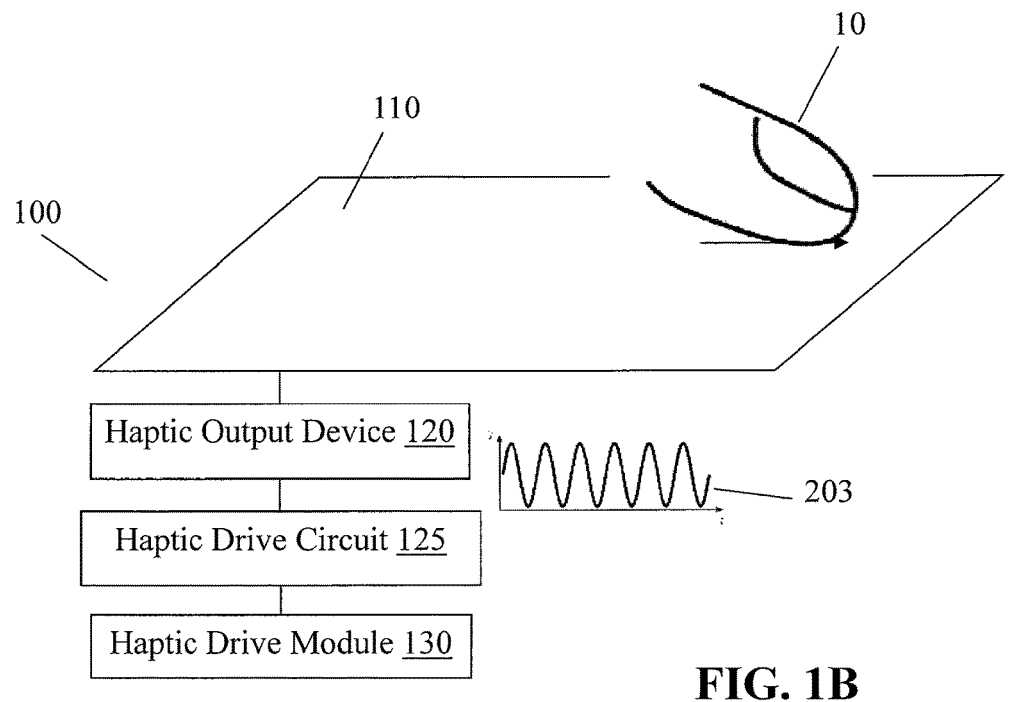

In an embodiment, haptic drive module 130 may cause haptic output device 120 to alter the haptic effect. FIGS. 1A-1B illustrate, for example, altering a frequency of a periodic haptic effect as finger 10 or any other object creating a touch input moves across surface 110. For example, as illustrated in FIG. 1B, a haptic drive signal 203 may be altered so that haptic drive signal 203 has a greater frequency as compared to haptic drive signal 201 of FIG. 1A. Generating periodic haptic effects is discussed in more detail in U.S. patent application Ser. No. 13/665,526, titled "Method and Apparatus for Simulating Surface Features on a User Interface with Haptic Effects," filed Oct. 31, 2012, the entire content of which is incorporated herein by reference.

Figure 2A:
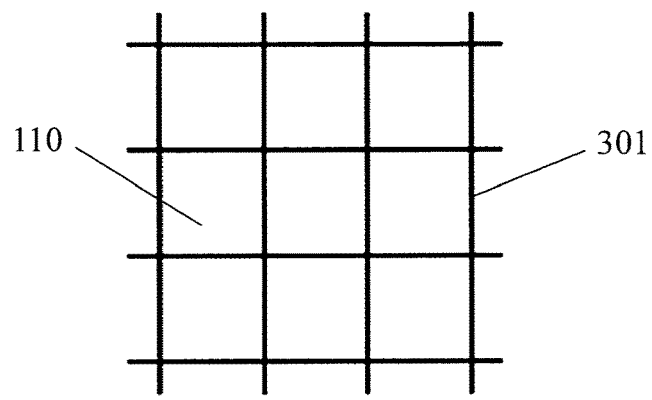
FIGS. 2A-2C schematically illustrate spatial patterns that may be generated on a surface of the apparatus of FIG. 1A.
Figure 2B:
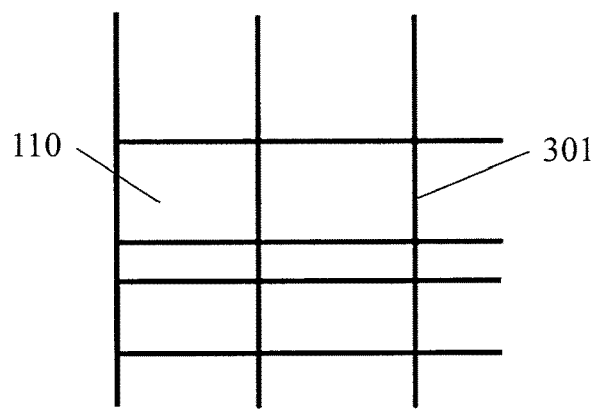
Figure 2C:
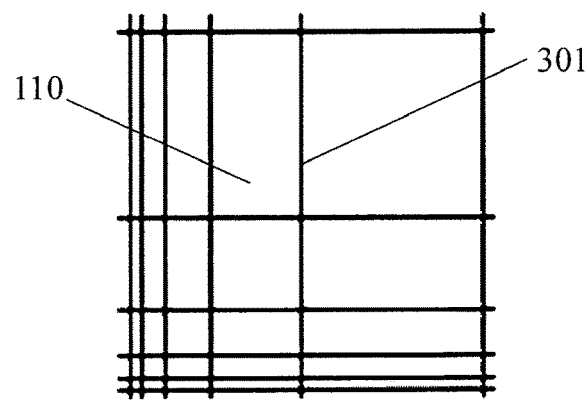

In an embodiment, a spatial pattern may comprise an arrangement of one or more spatial pattern components, which may include lines, circles, points, or tiles. For example, FIGS. 2A-2C illustrate a spatial pattern comprising a grid of lines. As a user's finger or any other touch input passes line 301 or any other spatial pattern component of the grid, a haptic effect may be generated to indicate presence of the line. The haptic effect may be generated by haptic output device 120, for example, or any other haptic output device. The lines or other spatial pattern components may be displayed on surface 110 or any other surface, or may be represented solely through haptic effects. In an embodiment, each spatial pattern component may correspond with a coordinate position, such as a X-coordinate corresponding with a vertical grid line or a Y-coordinate corresponding with a horizontal grid line. In some instances, the coordinate positions may be displayed along with the spatial pattern components.

In an embodiment, grid lines or other spatial pattern components of a spatial pattern may be evenly spaced, as illustrated in FIG. 2A. In an embodiment, grid lines or other spatial pattern components of a spatial pattern may be unevenly spaced, as illustrated in FIGS. 2B-2C. In one example, as illustrated in FIG. 2B, vertical grid lines may be evenly spaced, while horizontal grid lines may be unevenly spaced. In another example, as illustrated in FIG. 2C, both vertical grid lines and horizontal lines may be unevenly spaced. Spacing between grid lines may follow a predetermined relationship, such as a polynomial or exponential relationship. For example, spacing between a pair of grid lines in FIG. 2C may be double that of spacing between an adjacent pair of grid lines.

Figure 3A:
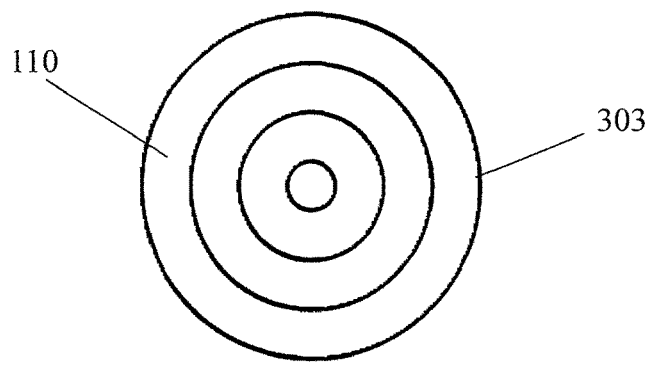
FIGS. 3A-3C schematically illustrate spatial patterns that may be generated on the surface of the apparatus of FIG. 1A.
Figure 3B:
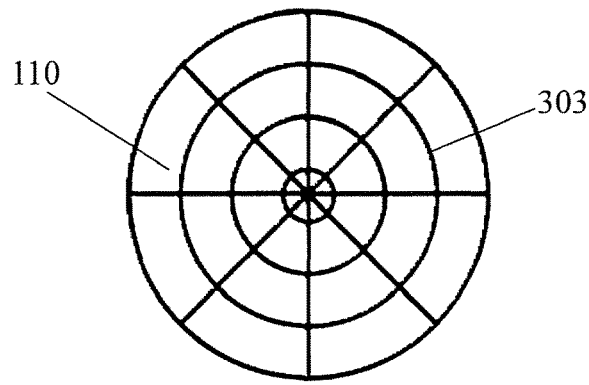
Figure 3C:
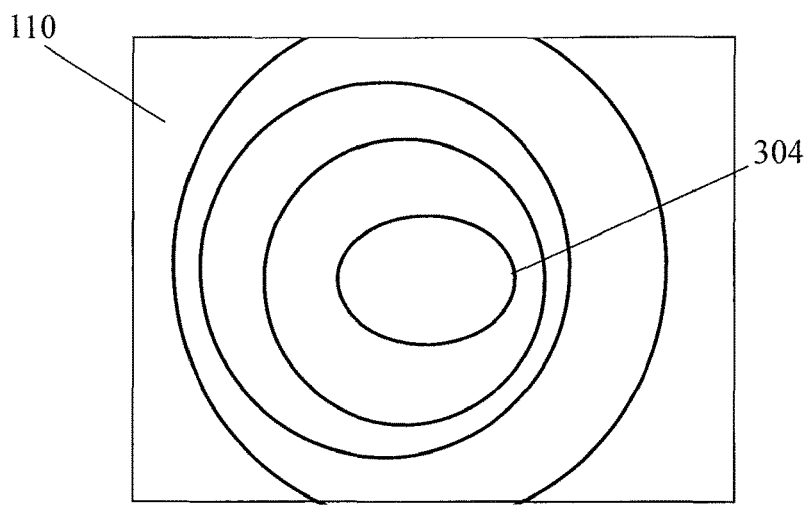

FIGS. 3A-3C illustrate a spatial pattern having grid circles, such as grid circle 303, as spatial pattern components. In an embodiment, each circle may correspond with a coordinate position, such as a radius coordinate. For example, FIG. 3A illustrates a plurality of concentric grid circles that may each correspond to one of a plurality of radius coordinates. FIG. 3B further illustrates a spatial pattern that may combine circles with lines. In some instances, each circle may correspond to a radius coordinate and each line may correspond to an angle coordinate. In such instances, the concentric grid circles and grid lines may represent positions on surface 110 through a polar coordinate system. While FIGS. 3A-3B illustrate concentric circles that are evenly spaced, FIG. 3C illustrates that a spatial pattern may comprise circles that are unevenly spaced, that are not concentric, or any combination thereof. As further illustrated in FIG. 3C, a spatial pattern may more generally comprise one or more elliptical spatial pattern components 304. A spatial pattern component may further have one or more dimensions that is bigger than a surface (e.g., surface 110) of a user interface device. In such instances, the user interface device may represent only part of the spatial pattern component on the device's surface. In an embodiment, two spatial pattern components, such as two grid circles, or more generally two grid ellipses, may intersect.

Figure 4A:
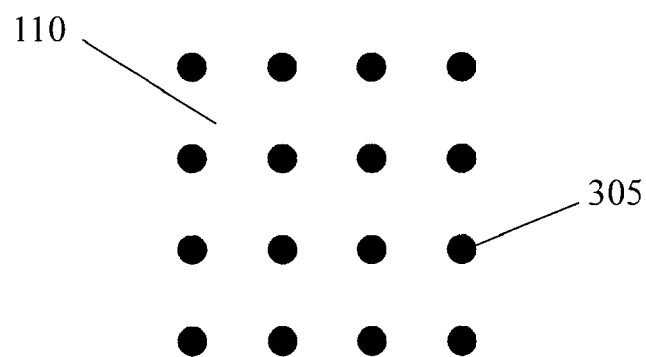
FIGS. 4A-4C schematically illustrate spatial patterns that may be generated on the surface of the apparatus of FIG. 1A.
Figure 4B:
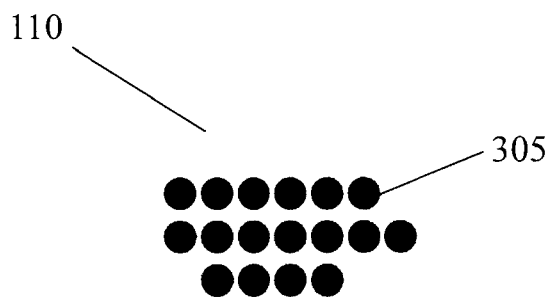
Figure 4C:
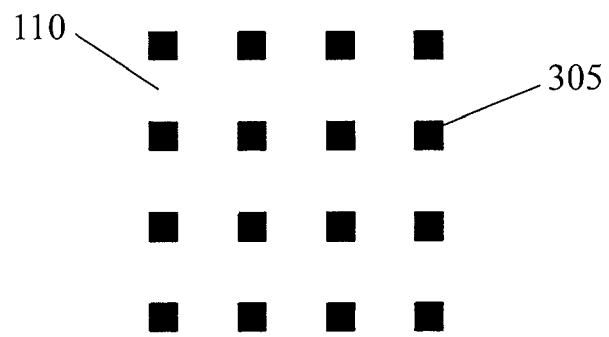

FIGS. 4A-4C illustrate grid points, such as grid point 305, as spatial pattern components. In an embodiment, grid points of a spatial pattern may be arranged in one or more rows and one or more columns. For example, grid points in each row or column may be evenly spaced and may be aligned with grid points in another row or column, as illustrated in FIG. 4A. Each grid point 305 may represent one or more coordinate positions, such as an X-coordinate and a Y-coordinate. In some instances, grid points in a row or column may be unevenly spaced. In some instances, grid points in rows or columns may be staggered. Rows or columns may, in some cases, have different numbers of grid points, as illustrated in FIG. 4B. As further illustrated in FIG. 4B, the grid points may represent only a portion of a surface of a user interface device.

In an embodiment, grid points of a spatial pattern may be arranged in any other manner. For example, grid points may be arranged to approximate a shape, such as a circle, square, any other shape, or any other pattern.

In an embodiment, a grid point 305 may have a simulated shape. For example, if a grid point has sufficient size, a touch input may touch multiple locations of the grid point. A haptic effect may vary based on a location of the grid point being touched. Varying the haptic effect based on the location may simulate a shape of the grid point. For example, FIGS. 4A and 4C illustrate grid points that may have sizes on the order of an average size of a fingertip. Each grid point in FIG. 4A may have a simulated shape of a circle, while each grid point in FIG. 4C may have a simulated shape of a square.

Figure 5A:
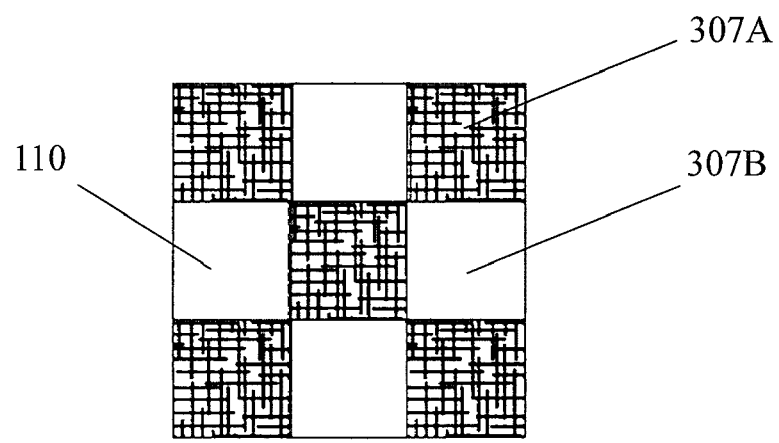
FIGS. 5A-5B schematically illustrate spatial patterns that may be generated on the surface of the apparatus of FIG. 1A.
Figure 5B:
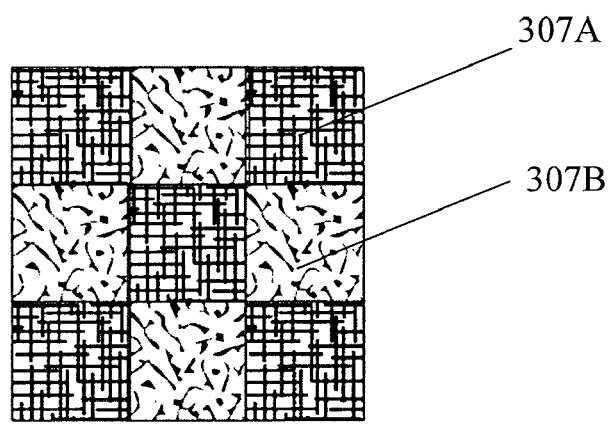

FIGS. 5A-5B illustrate tiles, such as tile 307A and tile 307B, as spatial pattern components. In an embodiment, each tile may be represented through a haptic effect that simulates a texture or any other tactile sensation in the tile. For example, when a touch input is at tile 307A, a haptic effect may be generated with a periodic drive signal. In an embodiment, as illustrated in FIG. 5A, a tile such as tile 307B may be associated with no haptic effect so as to provide contrast with tile 307A. In an embodiment, as illustrated in FIG. 5B, a tile such as tile 307B may be associated with another haptic effect so as to provide contrast with tile 307A. The other haptic effect may be generated with a different periodic drive signal than that used for tile 307A. The different periodic drive signal may have a different frequency, different amplitude, any other different property, or any combination thereof. A grid tile may have a shape that comprises a circle, an ellipse, a rectangle, a square, a triangle, a hexagon, or any other shape.

Figure 5C:
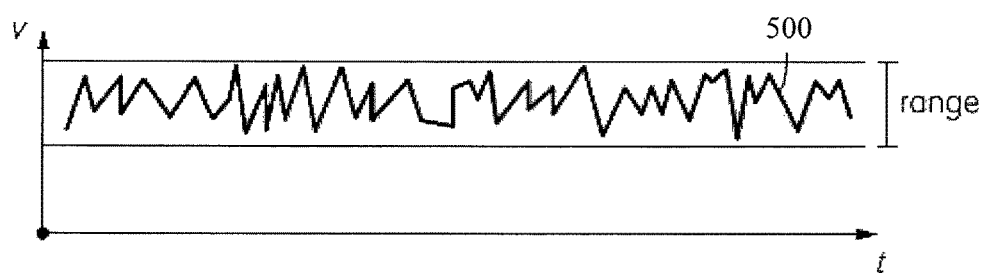
FIGS. 5C-5D schematically illustrate embodiments of haptic drive signals that may be used to generate haptic effects that simulate a texture.

In an embodiment, a haptic effect that simulates texture may be based on a random or pseudo-random haptic drive signal, such as signal 500, illustrated in FIG. 5C. Stochastic effects of the random or pseudo-random signal may add realism to a simulated surface feature. In an embodiment, the random or pseudo-random signal may be used alone in generating a haptic effect. In an embodiment, values of the signal may be confined to a predetermined range. The random or pseudo-random signal may be generated from sampling one or more values of natural phenomena, from a Gabor function, a random number generator, or any other technique.

Figure 5D:
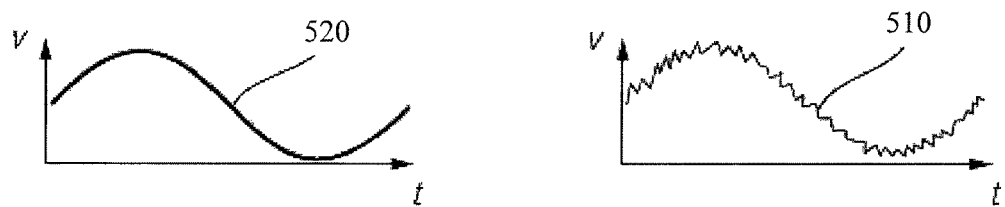

In an embodiment, a haptic effect may be based on a combination of a random or pseudo-random signal and another signal. For example, as illustrated in FIG. 5D, a haptic effect may be based on signal 510, which is a combination of the random or pseudo-random signal 500 and signal 520, which may be a periodic signal. In an embodiment, a haptic effect that simulates texture may be based on an arbitrary drive signal, which may be a drive signal having any form, as selected by the developer. Portions of the arbitrary drive signal may or may not be periodic, may or may not be random or pseudo-random, and may or may not be combined with other drive signals.

Figure 6A:
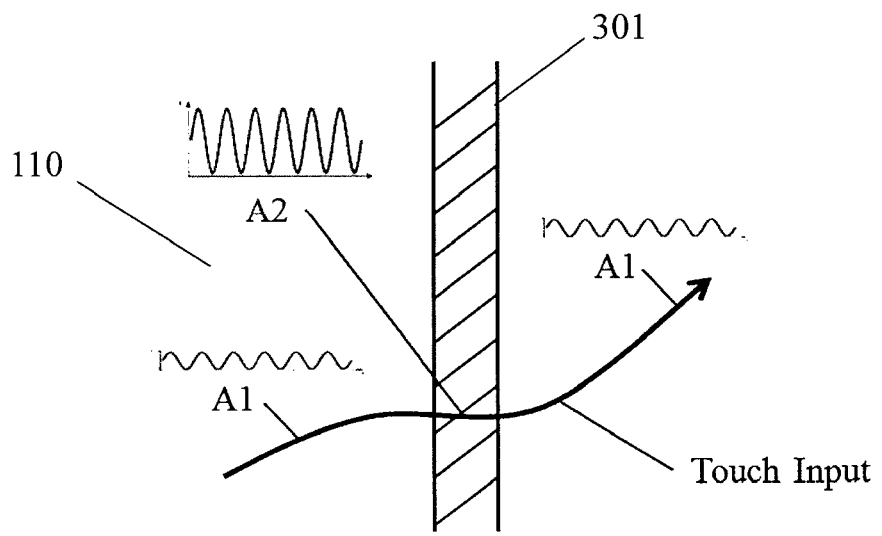
FIGS. 6A-6B schematically illustrate the apparatus of FIG. 1A generating a haptic effect to simulate a spatial pattern component on the surface of the apparatus.
Figure 6B:
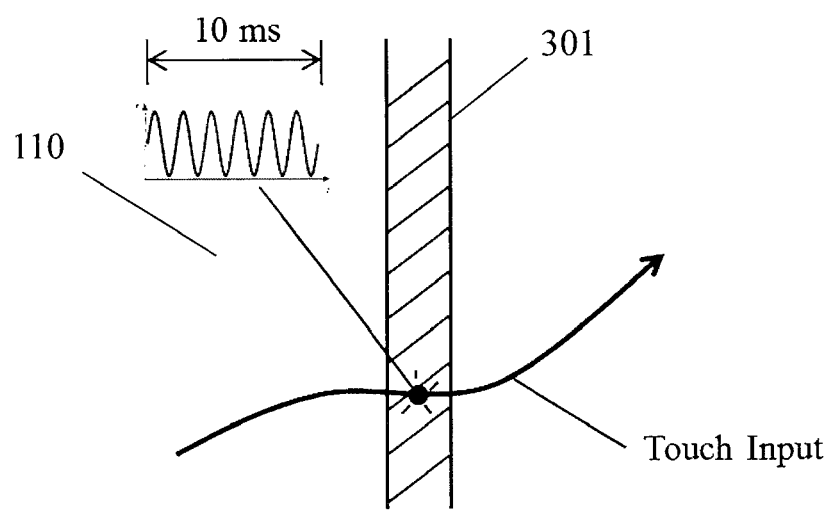

FIGS. 6A-6B illustrate various ways to represent a spatial pattern component through a haptic effect. The haptic effect may be generated with a periodic drive signal, as illustrated in the Figures. In an embodiment, as illustrated in FIG. 6A, a background haptic effect A1 may be generated when a touch input is detected. For example, when a touch input is detected on surface 110, a background periodic electrostatic effect or vibration may be generated. The background haptic effect A1 may have an intensity that is lower (e.g., 10%) of an intensity associated a haptic effect A2 for a spatial pattern component. When a touch input is detected to be at a spatial pattern component, such as grid line 301 (shown in an enlarged view in FIGS. 6A-6B), the haptic effect may be altered. For example, the intensity of the haptic effect may increase, or a frequency of the haptic effect may decrease. The change in the haptic effect may indicate presence of the spatial pattern component. A duration of the changed haptic effect may be based on a location of the touch input, may be based on a predetermined amount of time, on any other factor, or any combination thereof. For instance, the haptic effect may revert to the background haptic effect A1 when the touch input is detected to have moved away from the spatial pattern component. FIG. 6B illustrates another instance in which a haptic effect representing a spatial pattern component may have a predetermined duration, such as 10 milliseconds. FIG. 6B further illustrates an embodiment in which no background haptic effect is generated so that a haptic effect is only provided when the touch input is at the location of the spatial pattern component.

Figure 7:
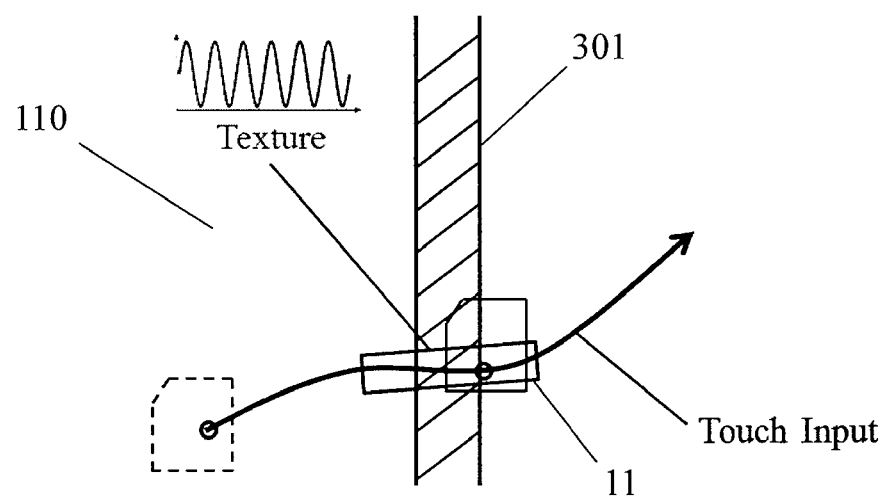
FIG. 7 schematically illustrates the apparatus of FIG. 1A generating a haptic effect to simulate a spatial pattern component on the surface of the apparatus.

In an embodiment, a haptic effect may generated based on an object being manipulated by a touch input. For example, FIG. 7 illustrates an object 11 being manipulated by a touch input. Object 11 may be an icon, a window, a drawing, an avatar, or any other object displayed on surface 110. The touch input may manipulate the object through lateral movement, vertical movement, rotation, any other manipulation, or any combination thereof. In the embodiment illustrated in FIG. 7, a haptic effect representing a spatial pattern component may be generated when object 11 touches the spatial pattern component. The haptic effect may be generated with touch input touching the spatial pattern component, or may be generated even if the touch input is not touching the spatial pattern component. For example, a haptic effect may be generated when a right side of object 11 touches grid line 301, even if touch input (e.g., a finger or stylus) is touching a left side of object 11 and therefore not touching grid line 301. In an embodiment, an intensity of the haptic effect may be based on a degree of overlap between the spatial pattern and object 11. If a spatial pattern component such as a line does not have thickness, the degree of overlap may be based on a length of the line that is covered by object 11. If a spatial pattern component such as a point has no area, the degree of overlap remains constant.

Figure 8A:
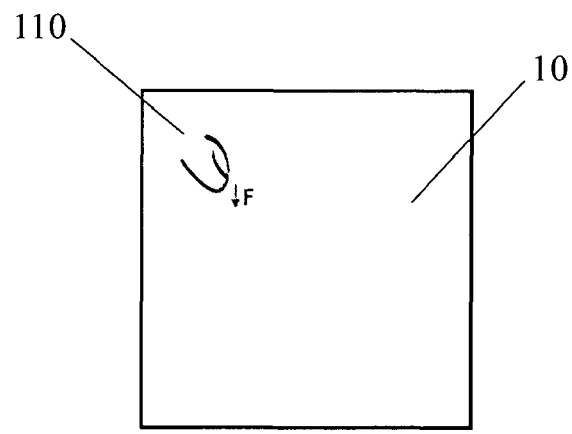
FIGS. 8A-8C schematically illustrate the apparatus of FIG. 1A generating a haptic effect based on a degree of applied pressure.
Figure 8B:
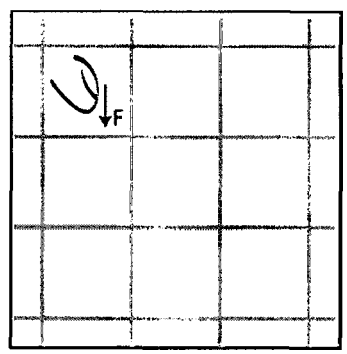
Figure 8C:
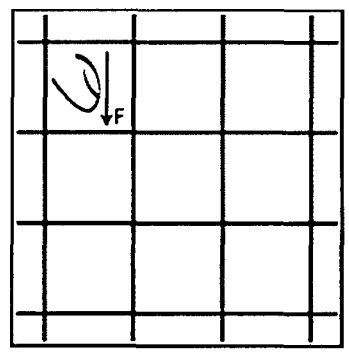

In an embodiment, an intensity of a haptic effect representing a spatial pattern component may be based on an applied force or pressure. For example, FIGS. 8A-8C illustrate a touch input being applied with three different degrees of pressure. If the pressure applied by the touch input does not reach a dynamic or predetermined threshold, as illustrated in FIG. 8A, surface 110 may have no spatial pattern represented on it and thus no haptic effect generated to represent a spatial pattern component. If the pressure applied by the touch input reaches or exceeds the dynamic or predetermined threshold, as illustrated in FIGS. 8B-8C, the haptic effect generated to represent spatial pattern components may have an intensity that depends on the degree of applied pressure. A higher degree of pressure may cause a more intense haptic effect to be generated. In an embodiment, an intensity of the haptic effect may be based on a velocity, acceleration, direction of movement, lateral force, contact area, shape of contact area, angle of approach, orientation, temperature, conductance, or dryness of a touch input or object creating the touch input, or based on a system input. In an embodiment where there are simultaneous touch inputs, such as on a multi-touch device, how the haptic effect changes may be based on a parameter of any one of the touch inputs or any combination of the touch inputs.

Figure 9A:
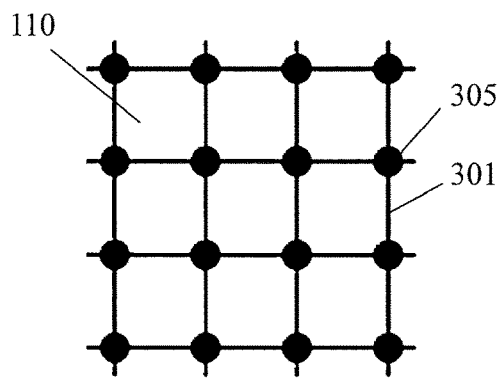
FIGS. 9A-9D schematically illustrate superposition of spatial pattern components on the surface of the apparatus of FIG. 1A.

In an embodiment, a spatial pattern may combine different spatial pattern components such as a combination of one or more grid lines, grid circles, grid points, grid tiles, or any combination thereof, as illustrated in FIG. 3B and FIGS. 9A-9D. In one example, as illustrated in FIG. 3B, a spatial pattern may comprise a combination of grid lines and grid circles. In another example, as illustrated in FIG. 9A, a grid pattern may comprise a combination of grid lines 301 and grid points 305. Different types of spatial pattern components may be superimposed on each other, or they may be represented at separate locations. For example, FIG. 9A illustrates grid points 305 superimposed on grid lines 301. The haptic effect representing the spatial pattern may change when a touch input touches any of the grid points. For instance, the haptic effect may be more intense at one of the grid points compared to the haptic effect generated at one of the grid lines.

Figure 9B:
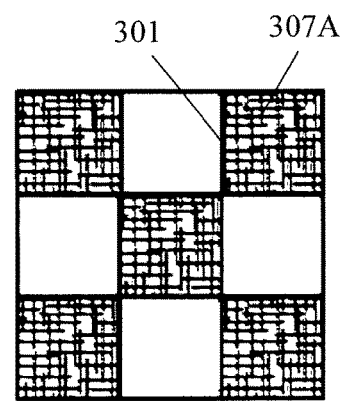

In another example, as illustrated in FIG. 9B, a grid line (e.g., grid line 301) may be superimposed on a grid tile (e.g., grid tile 307A). In this example, the grid line 301 may be represented by a haptic effect that is generated through an impulse drive signal, a periodic drive signal, a random or pseudo-random drive signal, an arbitrary drive signal, or any other drive signal. The haptic effect generated to represent grid line 301 may be superimposed on haptic effects generated to represent grid tile 307A and any other grid tile.

Figure 9C:
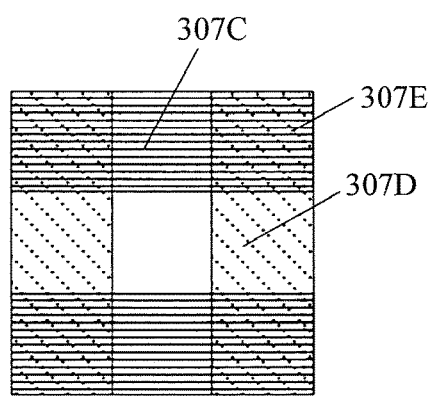

In another example, as illustrated in FIG. 9C, a grid tile (e.g., grid tile 307C) may be superimposed on another grid tile (e.g., grid tile 307D). In this example, one grid tile may be represented by a haptic effect generated through a first drive signal, and the other grid tile may be represented by a haptic effect generated through a second drive signal. If a touch input is at a location that corresponds to both tiles, such as at grid tile 307E, a haptic effect may be generated through a combination of the first drive signal and the second drive signal.

Figure 9D:
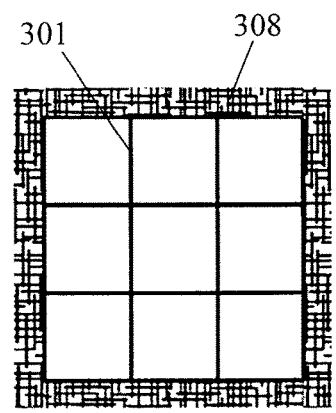

In an embodiment, a spatial pattern may be combined with more general surface features. For example, as illustrated in FIG. 9D, spatial pattern components such as grid lines 301 may be compared with a textured area 308 that borders the grid lines. In some instances, the grid lines 301 may be represented through an impulse drive signal while the textured area 308 may be represented through a periodic drive signal, a random or pseudo-random drive signal, an arbitrary drive signal, or any other drive signal.

In an embodiment, haptic effects among spatial pattern components may differ. For example, two haptic effects corresponding to two spatial pattern components may have different intensities, different durations, or any combination thereof. Two haptic effects may have different intensities if their respective drive signals have different amplitudes. If the two drive signals are periodic drive signals, they may also create different intensities through having different frequencies or wave shapes.

Figure 10A:
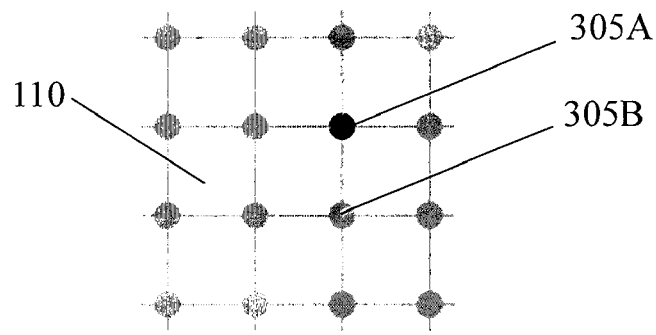
FIGS. 10A-10C schematically illustrate spatial pattern components that may be generated with different intensities at the surface of the apparatus of FIG. 1A.
Figure 10B:
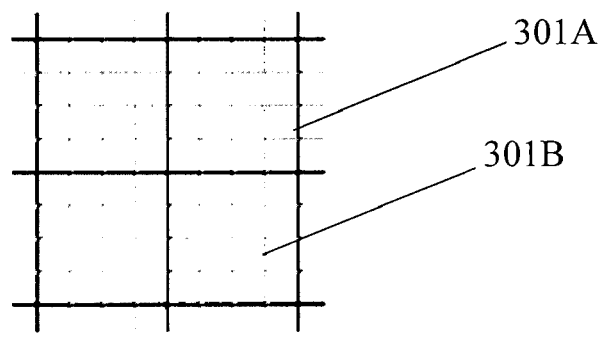

Different haptic effects may, for example, emphasize certain spatial pattern components over other ones. For example, as illustrated in FIG. 10A, a location corresponding to grid point 305A may be represented through a more intense haptic effect compared to a location corresponding to grid point 305B. The more intense haptic effect may indicate the location corresponding to grid point 305A as a more preferred location for a specific task. Further, as illustrated in FIG. 10B, different haptic effects among different grid lines may emphasize one grid line over another. For example, a more intense haptic effect may be generated to represent grid line 301A compared to grid line 301B. Grid line 301A may represent, for example, gradations in units of four, while grid line 301B may represent gradations in units of one. The more intense haptic effect generated for grid line 301A may thus emphasize the grid line that represents higher-level gradations.

In an embodiment, different haptic effects among different spatial pattern components may cause one spatial pattern component to feel thicker than other spatial pattern components. For example, grid line 301A may be generated through a haptic effect having greater intensity or longer duration compared to grid line 301B. In the example, grid line 301A may feel thicker than grid line 301B.

Figure 10C:
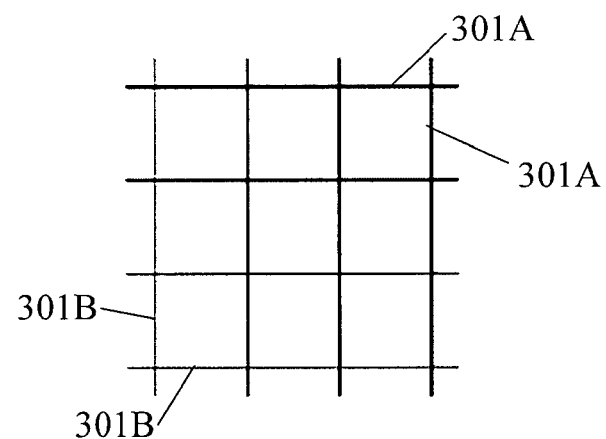

In an embodiment, haptic effects for different spatial pattern components may have a relationship in which an intensity, duration, or any other parameter of the haptic effects increases in value from one spatial pattern component to another. For example, FIG. 10C illustrates a spatial pattern in which an intensity of haptic effects for spatial pattern components increases from left to right on surface 110 and from bottom to top on surface 110, as represented by lines 301A, which represent a higher intensity, and lines 301B, which represent a lower intensity. In some cases, the gradient in intensity or duration may guide a user toward a location corresponding to a spatial pattern component having a highest intensity. FIG. 10C, for example, illustrates a gradient in intensity among spatial pattern components that guides a user towards a top right corner of surface 110.

Figure 11A:
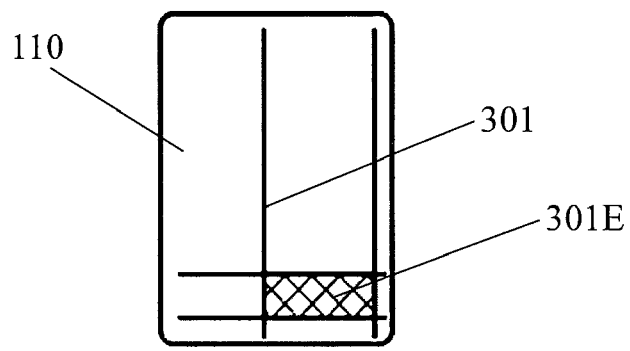
FIGS. 11A-11B schematically illustrate a button represented through spatial pattern components on the surface of the apparatus of FIG. 1A.
Figure 11B:
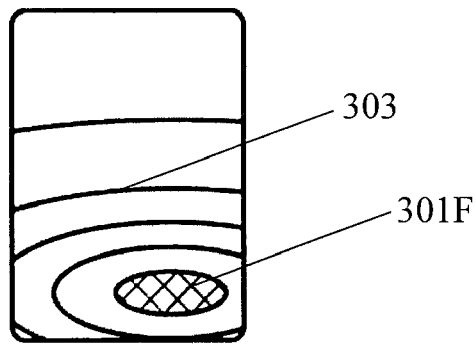

In an embodiment, a spatial pattern may represent a user interface object such as a button, an icon, a window, or any other object displayed on or otherwise represented on a user interface surface such as surface 110. For example, FIGS. 11A-11B illustrate a button being represented through a spatial pattern on surface 110. A spatial pattern component such as tile 301E or tile 301F may represent a button. When a touch input is at a location of tile 301E or tile 301F, a haptic effect may be generated to represent the tile. In an embodiment, the haptic effect may simulate a texture associated with the button. In an embodiment, spatial pattern components may guide a user toward the button. In one example, as illustrated in FIG. 11A, a grid line such as grid line 301 may guide a user toward the button associated with tile 301E. As a user moves horizontally away from grid line 301, the haptic effect representing the grid line may stop, whereas as the user moves vertically along grid line 301, the haptic effect representing the grid line may continue. The haptic effect representing grid line 301 may thus allow a user to follow the grid line towards the button. In that or another example, as illustrated in FIG. 11B, grid circles such as grid circle 303 may surround a button represented by tile 301F. In some instances, the grid circles that are closer to the button may be spaced more closely. A user may use haptic effects representing the grid circles to move from one grid circle to another, toward the button represented by tile 301F.

Figure 12A:
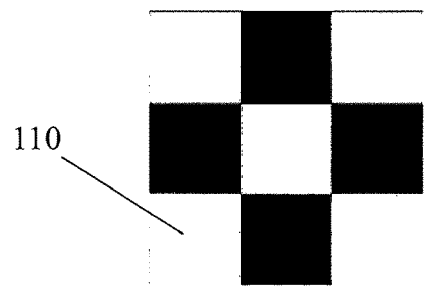
FIGS. 12A-12B schematically illustrate a plurality of pixels represented through spatial pattern components on the surface of the apparatus of FIG. 1A.
Figure 12B:
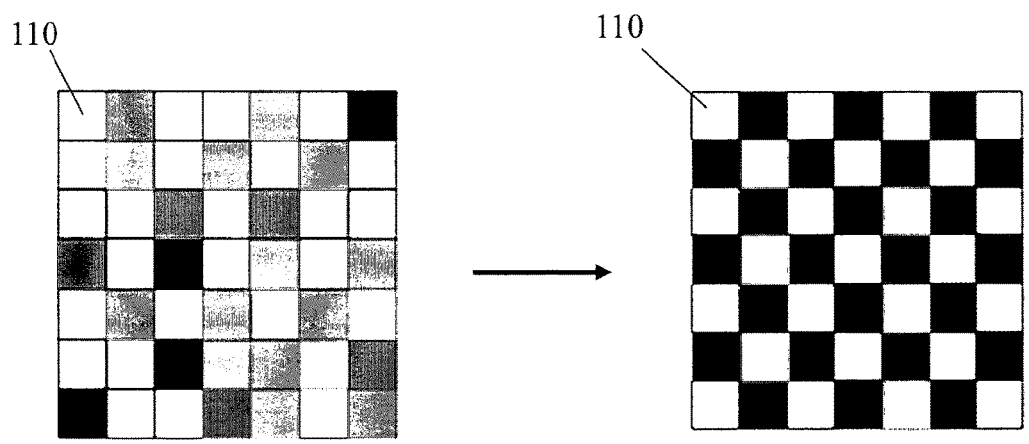

In an embodiment, a spatial pattern may represent a bitmap or other set of pixels, as illustrated in FIGS. 12A-12B. A group of grid tiles or any other spatial pattern components may represent the bitmap. The bitmap may represent a picture, a relief map, or any other information. In an embodiment, the spatial pattern components may represent a zoomed-in bitmap, as illustrated in FIG. 12A. In an embodiment, different haptic effects for different spatial pattern components may be generated to represent a different color or different shade of gray. In an embodiment, a colored or greyscale bitmap may be represented only through spatial pattern components having only a first haptic effect or no haptic effect, as illustrated in FIG. 12B. In the embodiment, the spatial pattern components may essentially represent a black-and-white version of the colored or greyscale bitmap. In such embodiments, the spatial pattern components may provide a tactile representation of the bitmap. Such a representation may be useful when surface 110, which displays the bitmap, is occluded by an object creating the touch input.

In an embodiment, a spatial pattern may represent text displayed on a user interface surface, such as surface 110 of FIGS. 13A-13B. For example, each letter may be represented through a spatial pattern component such as a rectangular tile or a line. For example, line 301 may represent the letter "L" in "Lorem." As letters of the text in FIG. 13A is highlighted by a touch input, a determination may be made that the touch input is crossing spatial pattern components that represent the letters. A haptic effect may be generated for each spatial pattern component that is touched by the touch input. In some instances, the haptic effects may allow a user to better identify what letter or other text element is about to be selected and may thus allow better control in manipulation of the text element.

In an embodiment, a spatial pattern may correspond to a keyboard displayed on a user interface surface, such as surface 110 of FIGS. 14A-14B. For example, a plurality of grid points may represent the keyboard, with each grid point representing a key of the keyboard. As illustrated in FIG. 14B, grid point 305 may represent the "g" key on the keyboard. In an embodiment, a more intense haptic effect may be associated with certain spatial pattern components. For example, because physical QWERTY keyboards often have raised surfaces that signify the "F" key and "J" key, spatial pattern components representing such keys on a virtual QWERTY keyboard may be represented through a more intense haptic effect. The spatial pattern may thus provide orientation cues by highlighting certain keys having distinct properties.

In an embodiment, a spatial pattern may correspond to a grid used in gestural unlock. For example, FIG. 15A illustrates a 3×3 grid that may unlock a device, such as a mobile device or other computing device, if a touch input on surface 110 makes a correct path across grid locations of the 3×3 grid. In the embodiment, grid points or any other spatial pattern components may correspond to grid locations of the 3×3 grid. As illustrated in FIG. 15B, a haptic effect that is generated for a spatial pattern component may identify to a user that a corresponding grid location is being touched. In some instances, the tactile sensation may allow a user to move faster from one grid location to another. In an embodiment, the 3×3 grid and touch input illustrated in FIG. 15A may be hidden from view, which may provide greater security during unlocking of the device.

In an embodiment, a spatial pattern may represent snapping locations on a user interface surface such as surface 110. For example, FIGS. 16A-16B illustrate grid lines that may represent locations to which object 13 may be snapped. Snapping may be used when moving object 13 to different locations, when resizing object 13, or for any other purpose. In FIG. 16A, each line may represent a snap location. As object 13 is being moved, a determination may be made whether object 13 is touching one of the lines 301. For example, a determination may be made whether a right side, left side, or some other portion of object 13 is touching one of the lines 301. In response to a determination that object 13 has touched one of the lines, a haptic effect may be generated to indicate presence of the line. The haptic effect may further indicate an opportunity to snap object 13 to a location corresponding to the line. For example, the haptic effect may indicate to a user that if he or she removes a touch input at surface 110, object 13 will snap to a location corresponding to the line 301. FIG. 16B illustrates snapping an icon or any other object to a grid location bounded by four lines. In an embodiment, a haptic effect may be generated in response to a determination that the object has touched one of the four lines or in response to a determination that the object has crossed one of the four lines and is bounded by the four lines. The haptic effect may indicate to a user that if he or she removes a touch input at surface 110, the object will snap to the grid location at which the object is located.

In an embodiment, a location of a spatial pattern component may be dynamic. For example, FIG. 17 illustrates line 301 used for snapping one object to another on surface 110, such as for snapping one window to another. In the example, the location of line 301 may be dynamic, being located at a left edge of one of the windows and moving as that window moves.

Figure 18A:
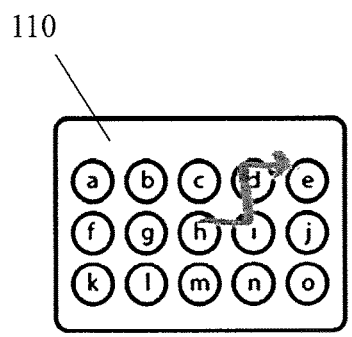
FIGS. 18A-18B schematically illustrate a spatial pattern component that represents a keyboard letter and that is generated with a dynamic intensity that is based on other keyboard letters selected on the surface of the apparatus of FIG. 1A.
Figure 18B:
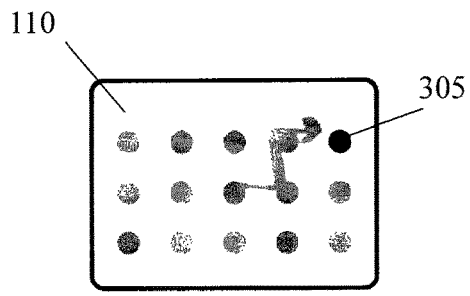

In an embodiment, an intensity of a haptic effect may be dynamic. As discussed above, the intensity of the haptic effect may depend on an applied pressure, contact area, velocity, or any other feature of a touch input. In some instances, the intensity of the haptic effect may depend on a system state. For example, FIGS. 18A-18B illustrate the keyboard of FIG. 14A accepting a Swype-like input method, where a user may input a word through a touch input that slides from letter to letter, lifting only between words. In the example, the system state may indicate letters that have already been touched by the touch input, such as the letters "h", "i", and "d." A spatial pattern component such as a grid point 305 may represent the next letter that is touched. An intensity of a haptic effect representing that spatial pattern component may be based on the system state. For example, the intensity may be based on a likelihood that the letter "e", which corresponds to the spatial pattern component, is part of a word being tracked by the system state. The haptic effect may thus have a higher level, because the letter "e" forms the word "hide", as compared to the touch input touching another letter such as "c" or "j".

Figure 19A:
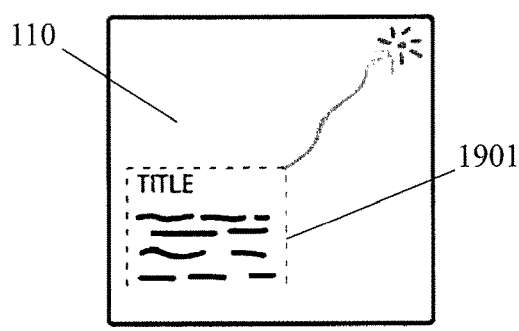
FIGS. 19A-19B schematically illustrate a haptic effect that is generated based on a size of content displayed on the surface of the apparatus of FIG. 1A.

In an embodiment, a haptic effect may be generated to facilitate more general snapping or scrolling operations on a user interface. For example, as illustrated in FIG. 19A, a haptic effect may be generated when an object such as a text window 1901 has been zoomed or otherwise enlarged to a threshold size. In some instances, the threshold may correspond to an optimal level of zooming. The optimal level may, for example, provide optimal readability of text on a website.

Figure 19B:
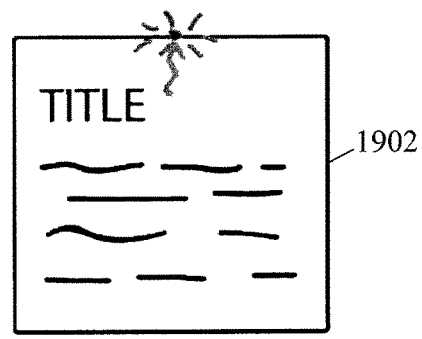

FIG. 19B illustrates a haptic effect being generated when an object such as a text window 1902 has been scrolled past a threshold position. In some instances, the threshold may correspond to an optimal position at which to stop the scrolling. For example, the optimal location may correspond to one at which a header in a text window object is placed at the top of the text window.

One or more operations of the one or more methods disclosed herein may be implemented as one or more instructions stored on a computer-readable medium and executed by one or more processors. For example, the one or more operations may be implemented through firmware or software code stored on RAM, ROM, EPROM, flash memory, a hard drive, or any other computer-readable medium.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of producing a haptic effect, comprising:
   generating a spatial pattern defining a plurality of bounded spatial regions on a display, the spatial pattern comprising multiple spatial pattern components, each spatial pattern component defining a boundary of at least one bounded spatial region and at least one spatial pattern component defining a boundary between two bounded spatial regions;
   detecting a touch input on a surface;
   receiving information indicative of a location of a virtual object being moved by the touch input on the surface;
   responsive to determining that the location of the virtual object corresponds with a location of one of the multiple spatial pattern components:
      determining a degree of overlap of the one of the multiple spatial pattern components by the virtual object;
      generating a drive signal in proportion to the degree of overlap; and
      applying, in response to determining that the location of the virtual object corresponds with the location of the one of the multiple spatial pattern components, the drive signal to a haptic output device that is configured to produce a haptic effect at the surface.

2. The method of claim 1, wherein the haptic output device comprises an electrostatic output device.

3. The method of claim 1, wherein the drive signal is an impulse drive signal.

4. The method of claim 3, wherein an intensity, duration, or shape of the impulse drive signal is based on a simulated size, thickness, or weight of the one of the multiple spatial pattern components.

5. The method of claim 1, wherein the haptic effect includes a texture, and wherein the drive signal is a periodic drive signal.

6. The method of claim 1, wherein the haptic effect includes a texture, and wherein the drive signal is a combination of a plurality of periodic drive signals.

7. The method of claim 1, wherein the haptic effect includes a texture, and wherein the drive signal is a random or pseudo-random drive signal.

8. The method of claim 1, wherein the surface at which the touch input is received is a surface of an interface device, wherein the interface device comprises a display, the method further comprising displaying the virtual object on the display, and wherein the haptic output device comprises an electrostatic output device.

9. The method of claim 1, wherein the one of the multiple spatial pattern components corresponds to a snap location on the display, the method further comprising generating the drive signal is further based on an opportunity to snap the virtual object to the snap location.

10. The method of claim 1, wherein at least one of the spatial pattern components are not visible.

11. The method of claim 1, wherein generating the drive signal is based on a pressure of the touch input.

12. A haptic effect enabled device, comprising:
   a haptic output device configured to produce a haptic effect at a surface;
   a processor in communication with a non-transitory computer-readable medium and configured to execute processor-executable program code stored in the non-transitory computer-readable medium to:
      generate a spatial pattern defining a plurality of bounded spatial regions on a display, the spatial pattern comprising multiple spatial pattern components, each spatial pattern component defining a boundary of at least one bounded spatial region and at least one spatial pattern component defining a boundary between two bounded spatial regions;
      receive information indicative of a location of a virtual object being moved by a touch input received at the surface;
      responsive to a determination that the location of the virtual object corresponds with a location of one of the multiple spatial pattern components:
         determine a degree of overlap of the one of the multiple spatial pattern components by the virtual object;
         generate a drive signal in proportion to the degree of overlap; and
         transmit the drive signal to the haptic output device.

13. The haptic effect enabled device of claim 12, wherein the haptic output device comprises an electrostatic output device.

14. The haptic effect enabled device of claim 12, wherein the drive signal is an impulse drive signal.

15. The haptic effect enabled device of claim 14, wherein an intensity, duration, or shape of the impulse drive signal is based on a simulated size, thickness, or weight of the one of the multiple spatial pattern components.

16. The haptic effect enabled device of claim 12, wherein the haptic effect includes a texture, and wherein the drive signal is a periodic drive signal.

17. The haptic effect enabled device of claim 12, wherein the haptic effect includes a texture, and wherein the drive signal is a combination of a plurality of periodic drive signals.

18. The haptic effect enabled device of claim 12, wherein the haptic effect includes a texture, and wherein the drive signal is a random or pseudo-random drive signal.

19. The haptic effect enabled device of claim 12, wherein the haptic effect enabled device is an interface device, and wherein the surface at which the touch input is received is a surface of the interface device, the interface device further comprising a display configured to display the multiple spatial pattern components, and wherein the haptic output device comprises an electrostatic output device.

20. The haptic effect enabled device of claim 12, wherein the one of the multiple spatial pattern components correspond to a snap location and wherein the drive signal is further based on an opportunity to snap the virtual object to the snap location.

* * * * *

UNITED STATES PATENT AND TRADEMARK OFFICE
CERTIFICATE OF CORRECTION

| | | |
|---|---|---|
| PATENT NO. | : 10,078,384 B2 | Page 1 of 1 |
| APPLICATION NO. | : 13/782771 | |
| DATED | : September 18, 2018 | |
| INVENTOR(S) | : Levesque et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this
Seventh Day of February, 2023

Katherine Kelly Vidal
*Director of the United States Patent and Trademark Office*